No. 844,708. PATENTED FEB. 19, 1907.
G. BLUEMEL.
TIME COMPUTER AND RECORDER.
APPLICATION FILED MAY 14, 1906.
6 SHEETS—SHEET 1.
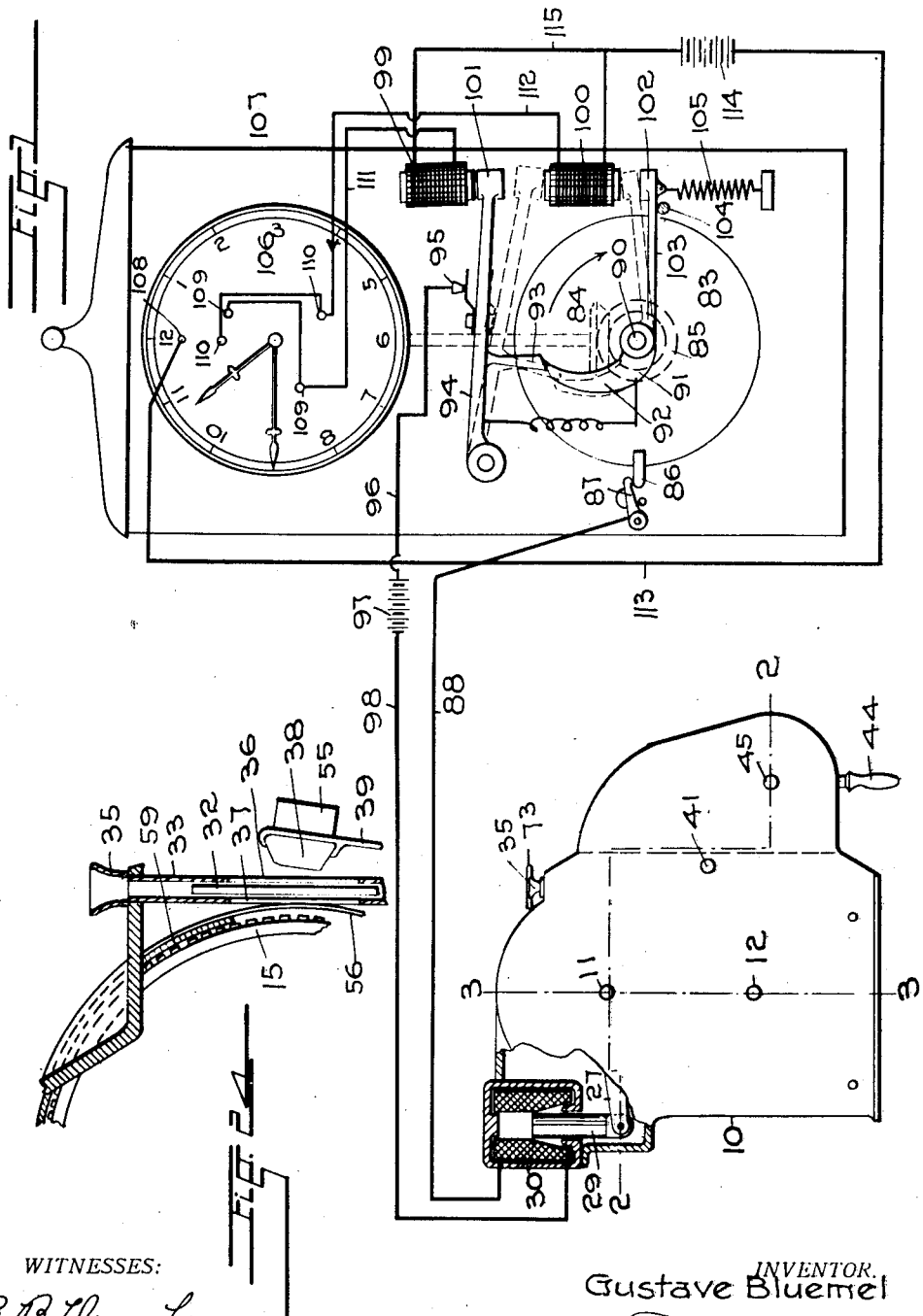
WITNESSES:
INVENTOR.
Gustave Bluemel
ATTORNEY.

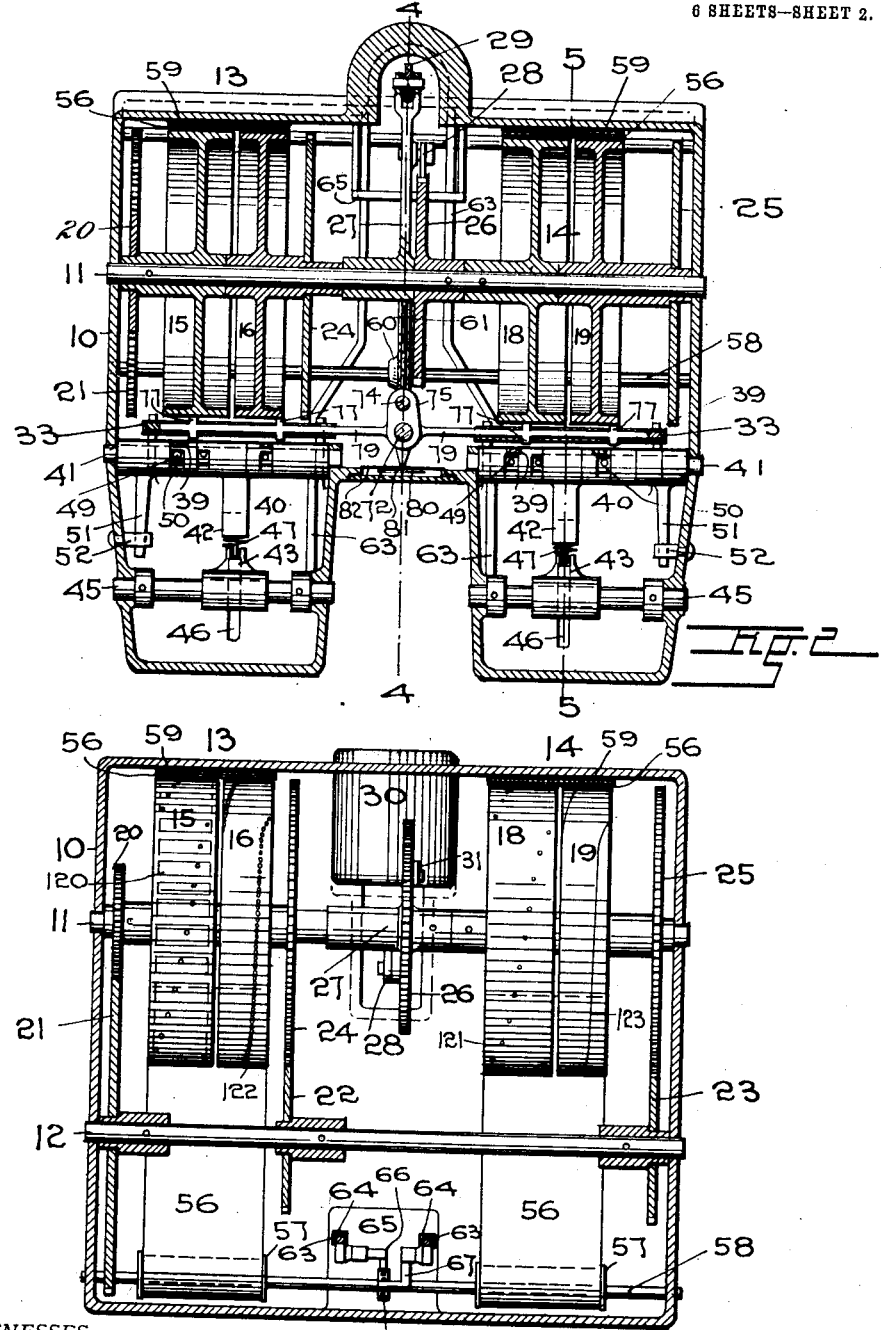

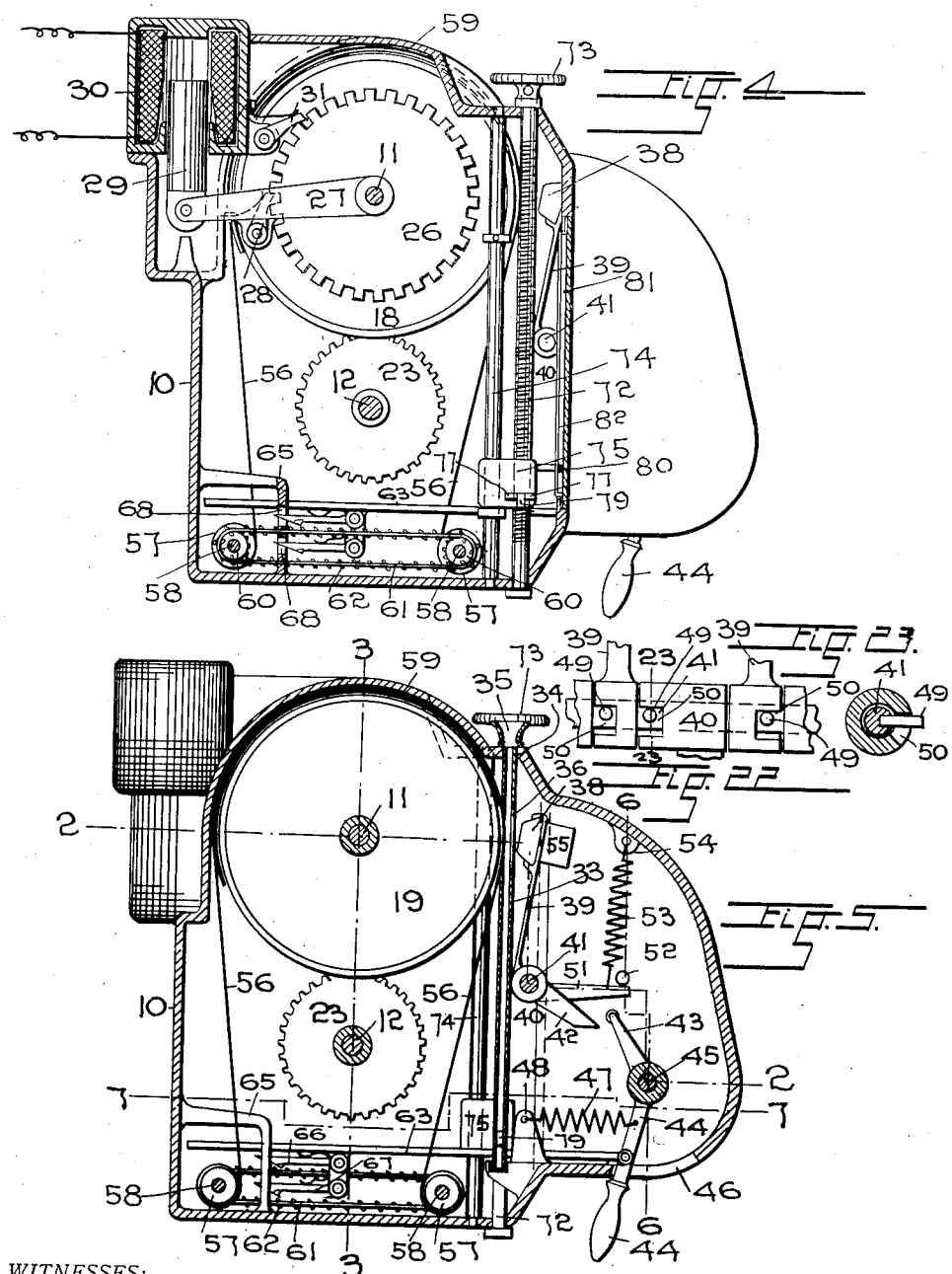

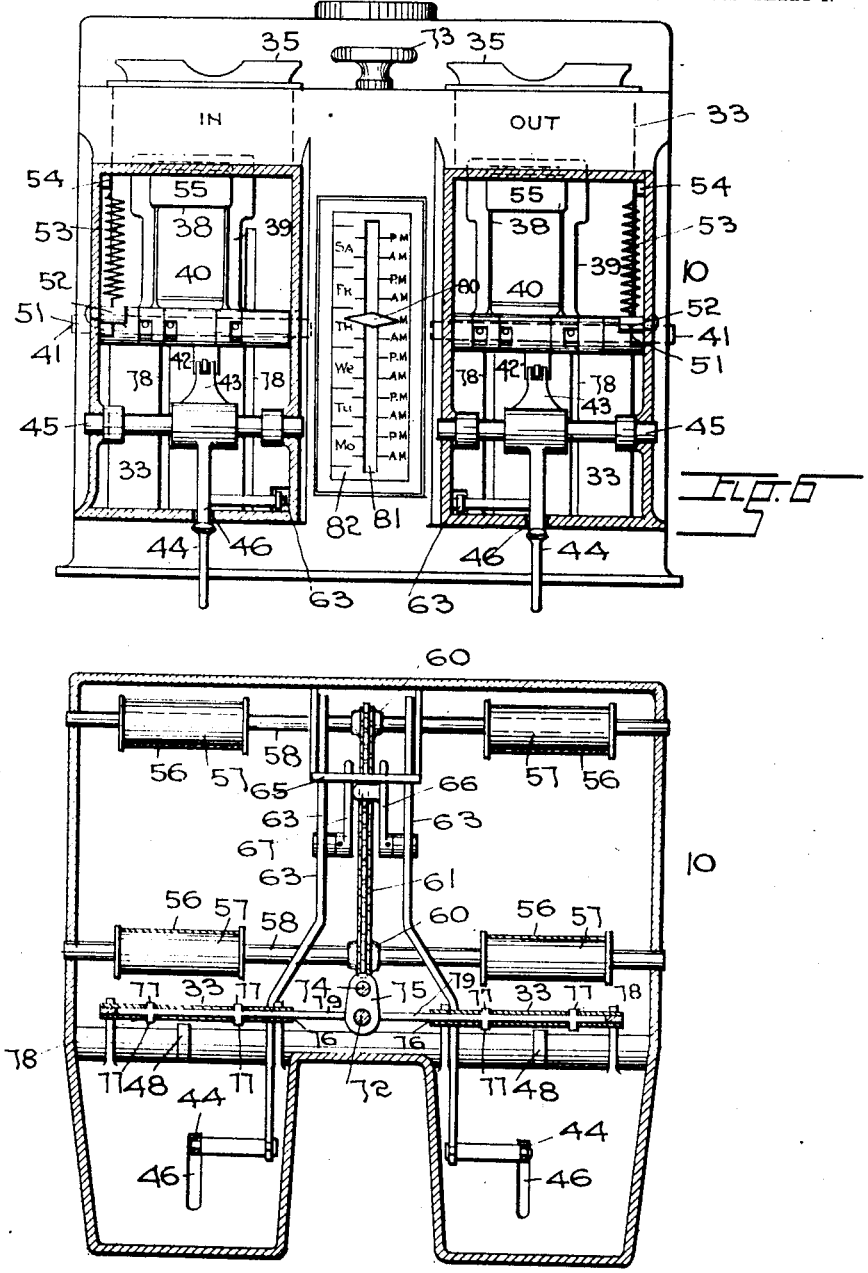

No. 844,708. PATENTED FEB. 19, 1907.
G. BLUEMEL.
TIME COMPUTER AND RECORDER.
APPLICATION FILED MAY 14, 1906.
6 SHEETS—SHEET 5.
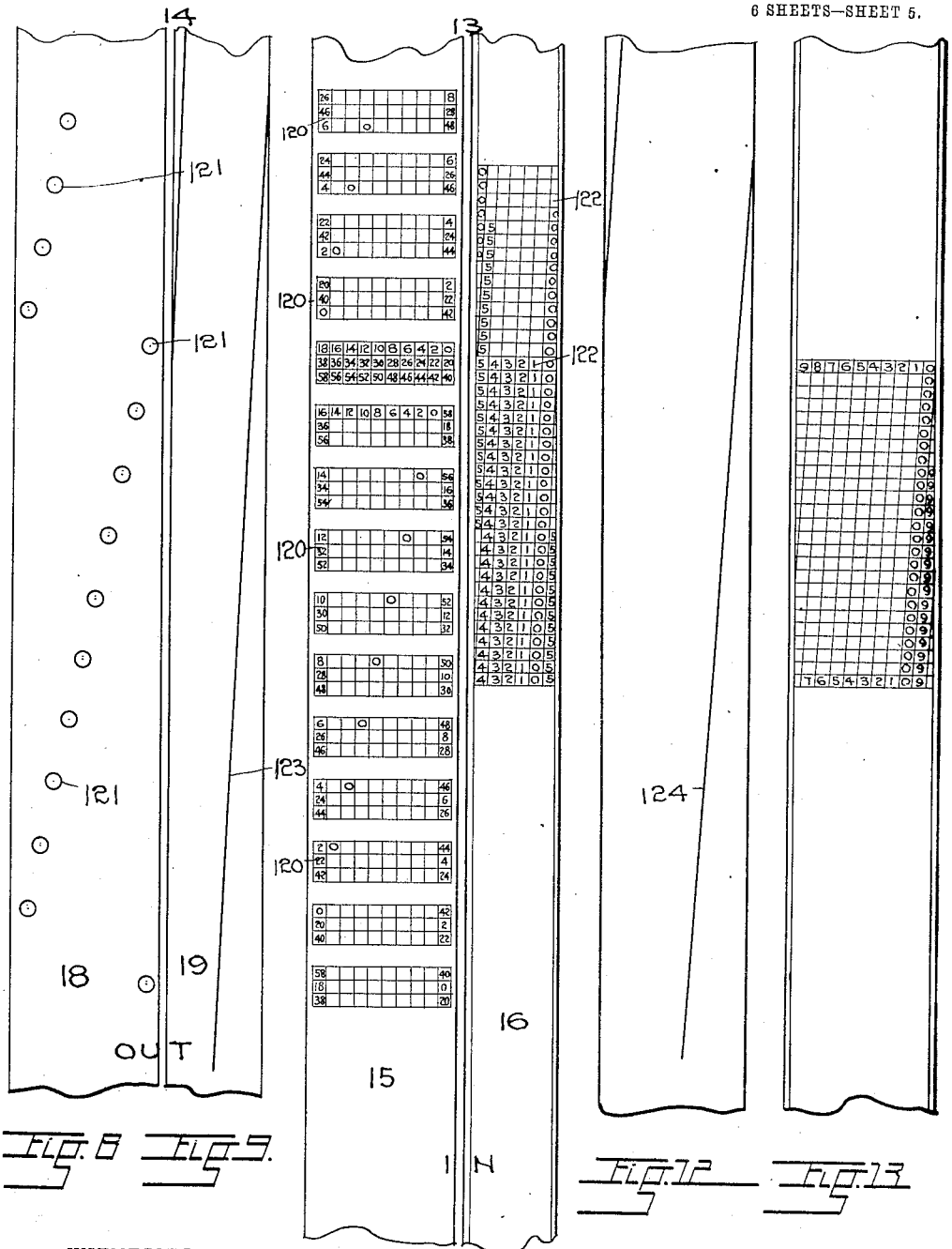
WITNESSES:
B. B. Ormsby
N. M. Sturip
INVENTOR.
Gustave Bluemel
BY
ATTORNEY.

No. 844,708. PATENTED FEB. 19, 1907.
G. BLUEMEL.
TIME COMPUTER AND RECORDER.
APPLICATION FILED MAY 14, 1906.
6 SHEETS—SHEET 6.
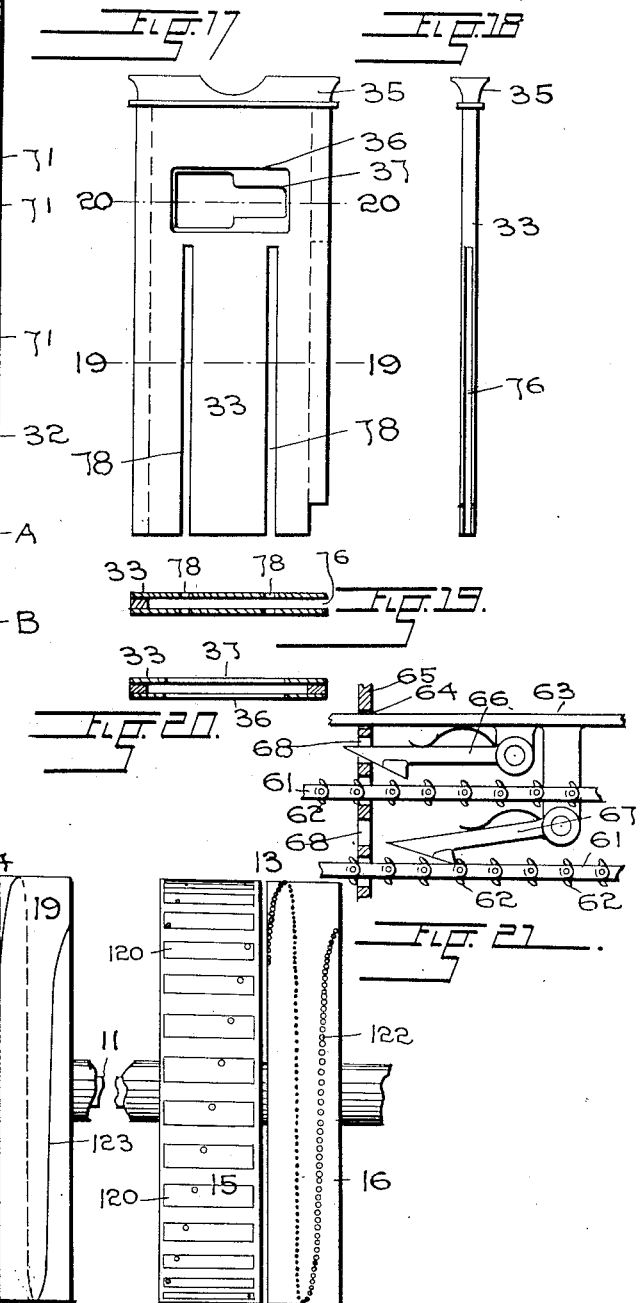
WITNESSES:
INVENTOR.
Gustave Bluemel
BY
ATTORNEY.

UNITED STATES PATENT OFFICE.

GUSTAVE BLUEMEL, OF DENVER, COLORADO.

TIME COMPUTER AND RECORDER.

No. 844,708.  Specification of Letters Patent.  Patented Feb. 19, 1907.

Application filed May 14, 1906. Serial No. 316,814.

*To all whom it may concern:*

Be it known that I, GUSTAVE BLUEMEL, a subject of Francis Joseph I, Emperor of Austria-Hungary, residing at Denver, in the county of Denver and State of Colorado, have invented certain new and useful Improvements in Time Computers and Recorders, of which the following is a specification.

This invention relates to improvements in time-recorders, and has for its object to provide a simple and effective apparatus by means of which measurements of time may readily and accurately be computed and recorded.

The device is especially adapted for use in stores, factories, and other establishments employing a large number of persons to compute and record the exact working time of each employee, and thus guard against inaccuracies, avoid dispute, and promote punctuality.

I attain these objects by the mechanism illustrated in the accompanying drawings, in the various views of which like parts are similarly designated, and in which—

Figure 1 represents a diagrammatical view of the clock-movement, electrical appliances, and circuit employed to operate the device; Fig. 2, a horizontal section taken along a line 2 2, Figs. 1 and 5; Fig. 3, a vertical section taken along a line 3 3, Figs. 1 and 5; Fig. 4, a central vertical section along a line 4 4, Fig. 2; Fig. 5, a vertical section along a line 5 5, Fig. 2; Fig. 6, a vertical section along the line 6 6, Fig. 5; Fig. 7, a horizontal section along a line 7 7, Fig. 5; Figs. 8 and 10, developments of the minute-recording wheels employed in the device; Figs. 9 and 11, developments of the hour-recording wheels; Figs. 12 and 13, developments of the minute-recording wheels, showing modified manner of arranging the peripheral characters; Fig. 14, a face view of the employee's time-card as used in connection with the device; Figs. 15 and 16, elevations of the two pairs of impression-wheels employed in recording the working time; Fig. 17, a front view of a card-holder or sheath; Fig. 18, an end view thereof; Fig. 19, a section taken along the line 19 19, Fig. 17; Fig. 20, a section along the line 20 20, Fig. 17; Fig. 21, an enlarged fragmentary view of the dogs and chain used to feed the inking-ribbon; Fig. 22, a fragmentary enlarged view of a portion of one of the platen shafts and collars; Fig. 23, a section along a line 23 23, Fig. 22; and Fig. 24, an enlarged fragmentary section showing the relative arrangement of an impression-wheel, platen, inking-ribbon, and time-card.

In connection with the views it should be observed that for convenience in description the characters on the impression-wheels, as illustrated in Figs. 8 to 13, inclusive, have been shown in positive position instead of reversed, as they must naturally be in practice to produce a positive impression on the cards.

Referring to the drawings, 10 represents a suitable casing, in which are journaled the horizontal vertically-alined shafts 11 and 12. Mounted upon shaft 11 are two pairs of impression drums or wheels 13 and 14, respectively, comprising the minute and hour recording wheels 15 and 16 and 18 and 19.

The minute-wheels 15 and 18 are firmly secured to the shaft by pins or analogous means, while the adjacent wheels 16 and 19 are loosely mounted thereon. Fixed upon the hub of wheel 15 is a gear-wheel 20, which meshes into a larger wheel 21, mounted upon shaft 12. The latter is, furthermore, provided with two pinions 22 and 23, which respectively engage corresponding gear-wheels 24 and 25, secured upon the hubs of the loose impression-wheels 16 and 19. By this arrangement one revolution of shaft 11 and the thereupon secured wheels 15 and 18 will cause a fraction of a revolution of the hour-wheels 16 and 19.

Shaft 11 is rotated through instrumentality of a toothed wheel 26, mounted thereon in between the two pairs of impression-wheels. A lever 27, fulcrumed at one end on the shaft in juxtaposition to wheel 26, has a spring-actuated pawl 28, which normally engages the teeth of the wheel, while its opposite or free extremity connects with the lower end of the core 29 of an electromagnet 30, secured to casing 10. A second spring-impelled pawl 31, pivoted to a suitable portion of the casing and engaging the teeth of wheel 26, prevents retrograde movement of the latter.

The cards 32, upon which the records are printed and which hereinafter will be described in detail, are inserted and held in the device in operative position to the type-wheels by means of two rectangular sheaths or holders 33, which extend perpendicularly within the casing in front of the two pairs of impression-drums 13 and 14. The upper extremities of the sheaths extend through corresponding slots 34 in the upper surface of the casing and are each surmounted by an outwardly-flaring mouthpiece 35 to facilitate insertion of the cards. The parallel side walls of the sheaths are provided with opposite openings 36 and 37, which in practice, extending in front of the impression-wheels, correspond in width and length to the size of the impression it is desired to produce. Slots 36 and 37 in the two sheaths are intended to admit platens 38, by means of which the record is printed and which are secured to the upper extremities of arms 39 of bell-crank levers 40 revolubly mounted on alined horizontal shafts 41, which are secured transversely of the casing. The extremities of the other arms 42 of levers 40 extend in the path of the outer extremities of upwardly-extending arms 43 of the operating-levers 44, which are pivotally secured inside the casing by means of horizontally-disposed axles 45. The lower ends of the operating-levers protrude through slots 46 in the lower portion of the casing within easy reach of the operator. Coiled springs 47, connecting the lower arms of levers 44 with lugs 48 on the casing, maintain the levers in their rearward or normal position. The upper and lower arms of the bell-crank levers 40 are mounted independently upon shafts 41, which are provided with laterally-disposed pins 49, extending through recesses 50 in the hubs of the arms. Arms 51, secured to shafts 41 and engaging stops 52 on the casing, limit its rotary movement, while coiled springs 53, connecting the said arms with lugs 54 on the casing, tend to retain the shafts in their normal positions.

When the bell-crank levers 40 are in their normal position, the upper shoulders of slots 50 engage pins 49, as illustrated in Figs. 22 and 23, in which condition they remain until, by pulling the protruding end of lever 44 forward, one of the arms 43, which may be provided with antifriction-rollers, is brought to engage the extremity of the corresponding arm 42, causing rotation of axle 41 and forward movement of the corresponding platen 38 until arm 42 is released, when by action of spring 53 the shaft returns to its normal position, and the platen, impelled by its momentum, continues in its rearward movement to engage the card placed in the sheath, and thus bring it in engagement with the raised type on the peripheral faces of the corresponding impression-wheels. The impetus of each platen is, as shown in the drawings, augmented by a weight 55, applied to the extremity of arm 39.

The ink required to print the record on the cards is supplied by ribbons 56, interposed between each pair of wheels and the card-holders and each wound upon two spools 57, which are mounted on parallel shafts 58, journaled in the lower portion of the casing. Ribbons 56, passing upwardly from the spools around the upper portion of the corresponding pairs of wheels, are held from contact therewith by arcuate hoods 59, interposed between the periphery of the wheels and the casing and are fed longitudinally during each movement of the operating-levers 44 through instrumentality of a mechanism which will now be described. Mounted upon shafts 58, in between the ribbon-spools 57, are sprocket-wheels 60, over which is stretched an endless sprocket-chain 61, the links of which have been provided with up and downwardly extending hook-shaped prongs 62. Pivotally secured to the operating-levers 46 are rear and inwardly extending rods 63, which are guided during their reciprocating movement in corresponding apertures 64 in a perpendicularly-disposed guide-plate 65, secured to the casing 10. The rods extending from the two operating-levers are provided with spring-impelled dogs 66 and 67, arranged to respectively engage the upper and lower parallel portions of the sprocket-chain.

When the operating-handles 44 are at rest, the outer beveled extremities of the dogs extend in suitably-arranged apertures 68 in the guide-plate 65 and in this position are out of engagement with the prongs on the chain. (See position of upper dog in Fig. 21.) The moment one of the bars 63 is moved backward its dog will engage the prongs on the corresponding portion of the chain, with the result that during movement of the operating-handle shafts 58 will revolve and cause the inking-ribbons to wind from one set of spools onto the other.

It will be observed that the movement of the two operating-handles causes the shafts to rotate in opposite directions and the ribbons to wind alternately on the two opposite sets of spools.

The cards employed in recording the working time of the various operatives are preferably arranged to state the hours and minutes of each working period during an entire week, as illustrated in Fig. 14, in which the card is shown to be longitudinally divided into two columns 69 and 70, respectively, intended to record the hours and minutes of the intervening periods. The face of card 32 is furthermore divided by transverse lines into a plurality of vertically-arranged spaces 71, designated from the top to the bottom of the card by the names of the days of the week from "Monday" to "Saturday," and each of these spaces is subdivided into two equal parts, the upper ones of which are marked "A. M." to record the working time during the forenoon of each day, while the other ones, being designated "P. M.," perform a similar function during the afternoons.

In addition to the various enumerated recording spaces the time-cards may bear the number or name of the operative, the rate of wages per hour at which he is engaged, and the total amount of money earned during the period recorded on the card.

When the card is placed in one of the two sheathes 33 of the apparatus prior to being printed, it is essential that the division indicating the time and the day during which the action takes place should be opposite the "printing-line," which in the device as described lies in a plane with the horizontal center line of the four impression-wheels. To accomplish this result, use is made of the following appliance. A threaded vertically-disposed rod 72 is rotatably mounted centrally between and in alinement with the two card-holders 33 and is provided with a milled head 73, by means of which it may be turned. A nut 75, having a correspondingly-threaded aperture, is placed on the rod, while a guide-rod 74, secured in parallel relation to rod 72, projects through a plain hole in the nut to hold the latter against rotation. Nut 75 has two opposite laterally-extending arms 79, which project inside the card-sheaths 33, through slots 76 in their adjacent edges, and each arm is furthermore guided by means of lateral projections 77, which in practice project through corresponding slots 78 in the parallel sides of the sheaths. The nut is furthermore provided with a pointer 80, which, extending through a vertical slot 81 in the front of the casing, designates the position of the arms 79 on a plate 82, secured on the outside of the casing and graduated to correspond reversely with the divisions on the time-cards.

The cards when placed in the sheaths engage the arms 79 and may vertically be adjusted by turning head 73, while the position of the pointer 80 on the graduated plate 82 indicates what portion of the cards is opposite the printing-line of the wheels.

The minute-wheels 15 and 18, mounted on shaft 11, are intermittently rotated by means of a clock-movement, as illustrated in Fig. 1, and impart a similar movement to the hour-wheels through instrumentality of the above-described chain of gears.

The minute part of the clock-movement, the details of which have for obvious reasons been omitted from the drawings, is connected by means of beveled gears 84 and 85 with a conveniently-located wheel 83, arranged to make one revolution during each predetermined fraction of an hour. Wheel 83 is provided with a tooth 86, extending beyond its periphery and intended to engage a pivoted gravity-dog 87, located in its path and electrically connected with the above-named electromagnetic coil 30 by means of a wire 88. Mounted upon shaft 90, around which wheel 83 rotates, is a bent lever 91, the upwardly-extending arm 92 of which engages a depending arm 93 of a lever 94, which is normally in contact with a contact-point 95, electrically connected by means of a wire 96 with a suitable source of electricity 97, the opposite terminal of which is electrically connected with the before-mentioned electromagnetic coil 30 by a wire 98. During each revolution of wheel 83 tooth 86, engaging dog 87, will thus close the electric circuit and cause core 29 to be drawn into the coil, which movement, through instrumentality of lever 27 and the toothed wheel 26, results in partial rotation of shaft 11 and the thereon mounted wheels.

To prevent movement of the impression-wheels during other periods but those established as working hour, I employ the following means to periodically break the connections between wheel 83 and the magnet 30.

Two electromagnets 99 and 100 are mounted in close proximity to wheel 83 and have a common armature 101, attached to the extremity of the before-named lever 94. A second armature 102, at the extremity of the arm 103 of lever 91, extends below the lower magnet 100 and is held in its normal position upon a stop 104 by means of a coiled spring 105. On the dial 106 of the clock-movement 107 are a number of contacts 108, 109, and 110, the former of which is adapted to be engaged by the minute-hand when at "twelve," while the others are arranged to come in contact with the hour-hand at various times of the day, (in the drawings at "one," "five," "eight," and "twelve.") Contacts 109 are preferably at the hour of commencement and contacts 110 at the hour of cessation of the working periods of the day. The former are electrically connected by a wire 111 with a pole of magnet 99, while the latter connect with magnet 100 by means of wire 112. Contact 108 connects, by means of a wire 113, with a source of electricity 114, the other electrode of which is connected with magnets 99 and 100 by wire 115.

When the minute-hand is at "twelve" and the hour-hand engages one of the contacts 109, the different members of the apparatus are in the position illustrated in the drawings and the impression-wheels are intermittently rotated until the end of the predetermined period, when the minute-hand is again at "twelve" and the hour-hand engages one of the contacts 110, with the result that magnet 100 is energized and attracts the armatures at the ends of arms 94 and 103, thus causing the disengagement of the arms 93 and 92 and the consequent breaking of the electric circuit which energizes magnet 30. The various parts remain in this position until the hour-hand has once more reached one of the contacts 109, when the energizing of magnet 99 will draw lever 94 into its former position and, owing to the beveled ends of the two arms 93 and 92, in engagement with the latter.

The four impression-wheels, as heretofore explained, are divided into two pairs 13 and 130

14, each comprising an hour recording and a minute wheel, while both minute-wheels and both hour-wheels rotate in unison.

The minute-wheels 15 and 18, being operatively connected with the clock-movement, are arranged to make one complete revolution during one hour of time, while the chain of gears connecting the hour-wheels 16 and 19 with the minute-wheels are proportioned to rotate the former once during the predetermined maximum working period, which in this instance is six hours.

At stated intervals wheel 83 completes one revolution, which causes the toothed wheel 26 to advance one tooth and the minute-wheels to describe a partial revolution, the length of which is in proportion to the complete revolution as the length of the stated interval is to one hour of time. It will thus be seen that the number of impulses required to complete one revolution of the minute-wheels is equal to the quotient of the length of one hour divided by the length of the stated aliquot interval and also equals the number of teeth in wheel 26. In the drawings and in this specification the length of the interval is assumed to be two minutes, and the consequent number of impulses required to complete a revolution thirty. One pair of the impression-wheels (in this instance 13) is intended to be employed at the commencement of the period of time to be measured, and is for convenience in describing called the "in" pair, while the other is brought to print on the card at the end of the period and is designated as the "out" pair. In connection it should be observed that either of the pairs can be employed as the "in" or the "out" wheels with equal results.

The peripheral face of the minute-wheel of pair 13, (in this instance the in pair,) is, as shown in Fig. 10, divided into a plurality of equidistant groups of numerals 120, equal in number to the number of the stated intervals contained in one hour's time or the number of impulses required to complete one revolution of the wheel, (in this case thirty.)

Each group comprises a series of equidistant numerals arranged transversely of the peripheral face of the wheel in arithmetical progression at a ratio equal to the length of the interval in minutes or the minimum period of time to be recorded, (in this instance two.) The terms of the progression commence with zero (0,) while the final one is less than the equivalent of one hour, or sixty minutes, by an amount equal to the common difference or ratio. The position of the zero is advanced uniformly in the direction of progression in each successive group, so that all the zeros of the various groups, and in consequence the other like numerals comprised therein, will lie in one or more helicoidal lines, the number of which depends on the number of transverse rows in which the numerals comprised in each group are arranged. If arranged in one row, the like numerals of the various groups will lie in continuous helical lines, while if placed in two or three rows, as in the drawings, the zeros, as well as the other like numerals, appear in two or more identical series of helical rows, which last arrangement is preferable in practice, as it reduces the width of the wheels. The peripheral face of the minute-wheel 18 of the out pair is provided with a plurality of indicating or check marks 121, preferably circular in form and arranged along one or more helicoidal lines in parallel relation to those on the "in" wheel and in position corresponding to and alined with the characters of the "zero-line." On the peripheral surface of the hour-wheel 16 of the "in" pair 13 are placed a plurality of equidistant helicoidally-arranged parallel rows 122 of equidistant identical numerals, the said rows being produced by a plurality of equidistant groups of numerals arranged transversely in arithmetical progression commencing at "zero" at a ratio of "one," the final term being less than the maximum number of hours in the period to be recorded by one.

The position of the zeros, and in consequence that of the other like numerals in the various groups, is advanced uniformly in the direction of progression in each successive group, thus forming the helical lines referred to.

On the cylindrical surface of the hour-wheel 19 of the "out" pair is placed a helical line 123, passing through points in line with and corresponding in position to the helicoidally-arranged zeros on the hour-wheel of the "in" pair.

Having thus described my invention in detail, its operation is as follows: The operatives employed in the establishment are each week supplied with cards arranged in the manner illustrated in Fig. 14 and which bear the name or number of the holder. The foreman or other authorized person having turned the head 73 until the pointer 80 is at the division designating the ensuing period of the day, the apparatus is ready to measure and record the time employed by each person during that portion of the hours allotted by the employer for work. As each operative arrives at the place of work he inserts his card into the sheath marked "In" and in front of the corresponding impression-wheels. By pulling the corresponding operating-lever 44 toward him he causes the particular portion of the raised characters on the cylindrical surface of the wheels which at the time of the operation was on the printing-line opposite the openings 36 and 37 in the sheath to be impressed upon the portion of the card in alinement therewith, as shown at A in Fig. 14. At the end of the working period the employees on leaving the establish- ment again insert their cards in the device, but this time in the sheath marked "Out," and by pulling the corresponding lever cause the portion of the helical line 123 and of the helicoidally-arranged series of indicating-marks 121 at the time of operation on the printing-line to be printed on the card over the impression made during the previous action. The location of these marks indicates the length of time intervening between the two actions in hours and minutes. For instance, supposing the lever at the "in" wheels is pulled at eight a. m. on Friday one of the groups of numerals 120 of the minute-wheel and a transverse fraction of the parallel helicoidal rows of figures on the hour-wheel are impressed on the place designated "Friday, a. m." on the card which rests on the arms 79 of the previously-adjusted nut 75. Should the card after being removed be immediately placed in the "out" sheath, one of the circles on the "out" minute-wheel and the portion of the helical line on the "out" hour-wheel would on pulling the lever be made to appear over the "zeros" on the previously-made impressions with which they are alined, as heretofore explained. Any interval of time, however, allowed to pass between the making of the first and second impressions will, if greater than the minimum of time to be recorded, result in a corresponding relative displacement at the printing-line of the line and circle from the respective zeros as appearing on the first impression, the circle on the minute-wheel advancing one numeral of the arithmetical progression on the corresponding "in" wheel at each impulse (in this instance at each interval of two minutes) and the portion of the line of the hour-wheel advancing simultaneously one space every hour, (in this case equal to one-sixth revolution of the wheels,) so that if the second impression were made at 12.32 p. m. the portion of the helical line on the "out" hour-wheel would appear between the "4" and the "5" on the first impression and the zero on the "out" minute-wheel over the "32" on the corresponding group 102, (see Fig. 14,) thus indicating the length of time between the two actions was four hours and thirty-two minutes. At the end of the week the time-keeper adds the various intervals recorded and multiplying the results with the rate per hour, as shown on the card, readily ascertains the amount due, which he writes in the appropriately-designated space. The card being handed to the operative, together with the amount of money appearing thereon, will thus effectively guard against dispute and prevent mistakes.

If so desired, the characters on the "in" minute-wheel may be arranged in decimal fractions of an hour, as illustrated in Fig. 13, and the corresponding "out" wheel have a line 124 corresponding to the helicoidally-arranged rows of zeros, as in Fig. 14. This arrangement, although the same in principle as the one previously explained, may be preferable, as it facilitates the work of multiplication at the end of the week. The shaft 11 may be connected directly with the clock-movement to rotate in unison therewith, and the movement of the wheels changed in consequence from an intermittent to a continual revoluble one, if so desired.

In Fig. 13 the face of the minute-wheel is shown to be divided in "tenths," and the record produced thereby is shown at B in Fig. 14.

I wish it understood that details of construction and the arrangement of the various elements as described may be varied within the principle of my invention, which more particularly resides in the arrangement of the hour and minute wheels and of the characters on their respective peripheral faces.

Having thus described my invention, what I claim is—

1. In a device of the class named, the combination of impression-wheels arranged in pairs, the wheels of one of the said pairs having each a peripheral series of equidistant groups of progressional numerals whose zeros advance in position transversely in each successive group, respectively denoting the number of hours in a space of time and a predetermined number of aliquot parts in one hour, and the second pair having peripheral indicatory type along the helical lines corresponding and alined with the zeros on the numerical wheels, means to rotate the wheels, and means to cause impressions to be made from each pair.

2. In a device of the class named, the combination of a wheel having peripheral equidistant groups of numerals arranged in arithmetical progression at a difference equal to the quotient of the number of groups and a period of time, the position of the zero being transversely advanced in each successive group, a wheel having a peripheral indicatory type along a line corresponding and alined with the zeros of the numerical wheel and means to rotate the said wheels in unison at the ratio of one revolution in the period.

3. In a device of the class named, the combination of a wheel having on its peripheral face a plurality of series of equidistant groups of numerals arranged in arithmetical progression at a ratio equal to the quotient of the total number of groups and a period of time, the position of the zero in each series being transversely uniformly advanced in each successive group, a wheel having peripheral indicative type along lines corresponding and alined with the zeros of the series on the numerical wheel and means to rotate the said wheels in unison at a rate of one revolution in the stated period.

4. In a device of the class named the combination of two impression-wheels having on their peripheral faces respectively, equidistant groups of numerals arranged in arithmetical progression at a ratio equal to the quotient of the number of groups and the length of one hour, their zeros advancing transversely in position in each successive group and indicative type along a line corresponding and in alinement with the zeros, two impression-wheels having on their peripheral faces respectively a plurality of groups of consecutive numerals denoting the number of hours in a space of time, whose zeros advance transversely in position in each successive group, and indicative type along lines corresponding and in alinement with the zeros, means to rotate the first two wheels at a rate of one revolution in the stated period, means to rotate the last two wheels at a velocity of one revolution in as many hours as the number of numerals in each group, the numerical and the indicatory wheels being separated in pairs and means to cause impressions to be made from each pair.

5. In a device of the class named, the combination of the revoluble impression-wheels, means to hold a card relatively thereto, a platen adapted to engage the card, an inking-strip wound on opposite spools and between the opposite faces of the card and the wheels, and endless sprocket-chain operatively connecting the spools and manual means to actuate the platen and having a dog adapted to engage the chain while operating.

6. In a device of the class named, the combination of sets of revoluble impression-wheels, means to hold a ticket in operative relation to each set, independent platens to engage the ticket, inking-strips adapted to engage the wheels, wound on opposite spools, a sprocket-chain operatively connecting the spools, operating-levers adapted to actuate the respective platens and dogs connected with the said levers to respectively move the chain in opposite directions.

7. In a device for measuring and recording intervals of time, the combination with a suitable motor of centrally-alined, diametrically-corresponding impression-wheels, arranged in pairs, and means to cause separate impressions to be made from each pair, the wheels of one of the said pairs having on their circumferential surfaces, respectively a series of progressive numerals denoting the number of hours contained in a space of time and the number of aliquot parts contained in one period, and the wheels of the other pair having on their peripheral surfaces indicative type arranged to indicate, when printed over the first-made impression the length of the interval in time between the actions for making the two imprints.

8. In a device of the class named, the combination of two sets of diametrically-corresponding wheels, means to rotate the sets at uniform, relatively different velocities, the wheels comprising the sets being separated in two remote, centrally-alined pairs, respectively having along their circumferential surfaces groups of progressional numerals denoting the number of hours in a period and the number of aliquot fractions in an hour, and indicatory type arranged in helical lines corresponding with and alined with the zeros of the numerical wheels, and means to cause separate impressions to be made from each pair.

9. In a device of the class named, the combination of revoluble impression-wheels, an electromagnet arranged to cause rotation thereof, a motor to intermittently energize the magnet during uniform fractions of a period, and means to periodically interrupt the connection between the said motor and the said magnet during predetermined periods which exceed the length of intermission between the uniform periods of energization.

In testimony whereof I have affixed my signature in presence of two witnesses.

GUSTAVE BLUEMEL.

Witnesses:
 WM. R. FARRAR,
 G. J. ROLLANDET.